(12) United States Patent  (10) Patent No.: US 8,723,657 B2
Takasu  (45) Date of Patent: May 13, 2014

(54) INPUT DEVICE, VIBRATION DEVICE AND INPUT DETECTION METHOD

(75) Inventor: Shigeru Takasu, Nagano (JP)

(73) Assignee: Minebea Co., Ltd., Nagano (JP)

( * ) Notice: Subject to any disclaimer, the term of this patent is extended or adjusted under 35 U.S.C. 154(b) by 235 days.

(21) Appl. No.: 13/240,050

(22) Filed: Sep. 22, 2011

(65) Prior Publication Data

US 2012/0075086 A1    Mar. 29, 2012

(30) Foreign Application Priority Data

Sep. 24, 2010   (JP) ................................ 2010-214225

(51) Int. Cl.
*G08B 6/00*   (2006.01)

(52) U.S. Cl.
USPC ...................................................... 340/407.2

(58) Field of Classification Search
USPC ...................... 340/407.2, 503, 609.16, 309.4; 345/156, 173
See application file for complete search history.

(56) References Cited

U.S. PATENT DOCUMENTS

| | | | | |
|---|---|---|---|---|
| 7,663,604 B2* | 2/2010 | Maruyama et al. | ........... | 345/173 |
| 7,952,566 B2* | 5/2011 | Poupyrev et al. | ............. | 345/173 |
| 2001/0035854 A1* | 11/2001 | Rosenberg et al. | ........... | 345/156 |
| 2006/0209037 A1* | 9/2006 | Wang et al. | ................... | 345/173 |
| 2008/0024459 A1 | 1/2008 | Poupyrev et al. | | |
| 2009/0017911 A1 | 1/2009 | Miyazaki | | |
| 2009/0167509 A1* | 7/2009 | Fadell et al. | ............... | 340/407.2 |
| 2009/0167704 A1* | 7/2009 | Terlizzi et al. | ................ | 345/173 |
| 2011/0216013 A1* | 9/2011 | Siotis | ............................ | 345/173 |
| 2012/0126962 A1 | 5/2012 | Ujii et al. | | |

FOREIGN PATENT DOCUMENTS

| | | |
|---|---|---|
| JP | 2003-272463 A | 9/2003 |
| JP | 2006-107140 A | 4/2006 |
| JP | 2006-134166 A | 5/2006 |
| JP | 2008-033739 A | 2/2008 |
| JP | 2009-037582 A | 2/2009 |
| JP | 2011-028663 A | 2/2011 |

OTHER PUBLICATIONS

Japanese Office Action, with English translation thereof, issued in corresponding JP patent application 2010-214225 on Jan. 24, 2014.

* cited by examiner

*Primary Examiner* — Phung Nguyen

(74) *Attorney, Agent, or Firm* — Carrier Blackman & Associates, P.C.; Joseph P. Carrier; Jeffrey T. Gedeon

(57) ABSTRACT

An input device includes an input operation unit, on which an input operation is performed; an input operation detection unit that detects at least one of acceleration and pressure to the input operation unit; an input determination unit that determines whether the at least one of acceleration and pressure detected by the input operation detection unit is an effective input operation; and a vibration unit that, when the at least one of acceleration and pressure is detected by the input operation detection unit, starts to vibrate before the input determination unit outputs a determination result.

12 Claims, 5 Drawing Sheets

INPUT DEVICE, VIBRATION DEVICE AND INPUT DETECTION METHOD

CROSS-REFERENCE TO RELATED APPLICATION

This application claims priority from Japanese Patent Application No. 2010-214225 filed on Sep. 24, 2010, the entire subject matter of which is incorporated herein by reference.

BACKGROUND

The present invention relates to a vibration device, an input device, which are detects an input operation and thus vibrates, and an input detection method of detecting the input operation.

With respect to input devices such as keyboard, switch and the like, an input device, which detects an input operation of a user and vibrates to inform the user of the detection of the input operation, has been known. For example, JP 2003-272463A discloses a switch device having a pressure sensor, which weakly vibrates when a touch panel is strongly pressed, and which strongly vibrates when the touch panel is weakly pressed.

However, since the pressure sensor may output an erroneous signal due to influences such as noise, it should be determined whether the output of the pressure sensor is effective. However, it takes time to perform the determination. When the vibration is started after a result of the determination is made, a time lag is caused after the user performs the input operation until the vibration. Accordingly, the user may feel a sense of discomfort.

In view of the above, the present invention is to provide a vibration device, an input device and an input detection method capable of quickly informing a user of detection of an input operation.

According to an aspect of the present invention, an input device includes an input operation unit, an input operation detection unit, an input determination unit and a vibration unit. An input operation is performed on the input operation unit. The input operation detection unit detects at least one of acceleration and pressure to the input operation unit. The input determination unit determines whether the at least one of acceleration and pressure detected by the input operation detection unit is an effective input operation. When the at least one of acceleration and pressure is detected by the input operation detection unit, the vibration unit starts to vibrate before the input determination unit outputs a result of the determination.

Also, according to another aspect of the present invention, a vibration device that is to be attached to an input device includes an input operation unit on which an input operation is performed and an input determination unit that determines whether an effective input operation is performed on the input operation unit. The vibration device includes an input operation detection unit and a vibration unit. The input operation detection unit detects at least one of acceleration or pressure to the input operation unit. The vibration unit starts to vibrate when the acceleration or pressure is detected by the input operation detection unit, the vibration unit and stops the vibration when an effective input operation on the input operation unit is not detected in a predetermined time period after the at least one of acceleration and pressure is detected.

In addition, according to another aspect of the present invention, an input detection method of using an input device having a vibration unit is provided. The input detection method first detects at least one of acceleration and pressure to an input operation unit. Then, it is determined whether the detected acceleration or pressure is an effective input operation. When at least one of acceleration and pressure is detected, the vibration unit starts to vibrate before a result of determining whether the detected at least one of acceleration and pressure is an effective input operation is obtained.

According to the present invention, since the vibration starts to vibrate without waiting for the determination result by the input determination unit, the user can quickly know that the input operation is detected.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION OF ILLUSTRATIVE EMBODIMENTS

Hereinafter, illustrative embodiments of an input device and an input detection method of the present invention will be specifically described with reference to the drawings.

First Illustrative Embodiment

Figure 1:
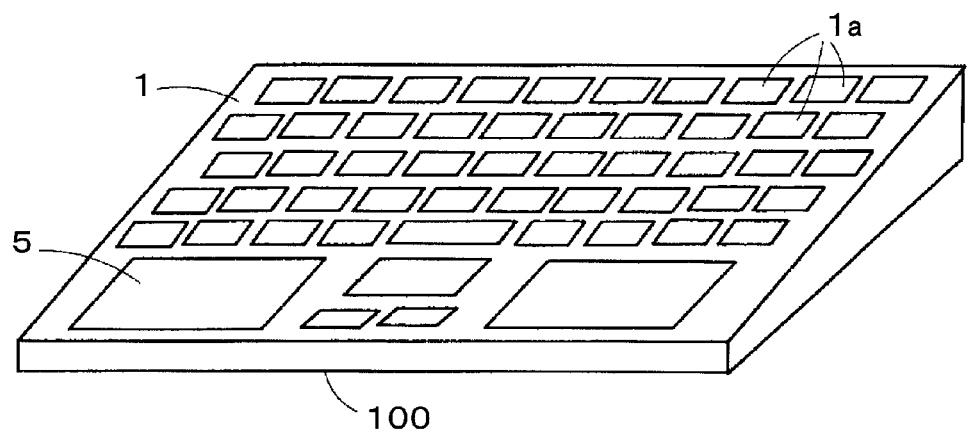
FIG. 1 is a perspective view illustrating an input device 100 according to a first illustrative embodiment.
Figure 2:
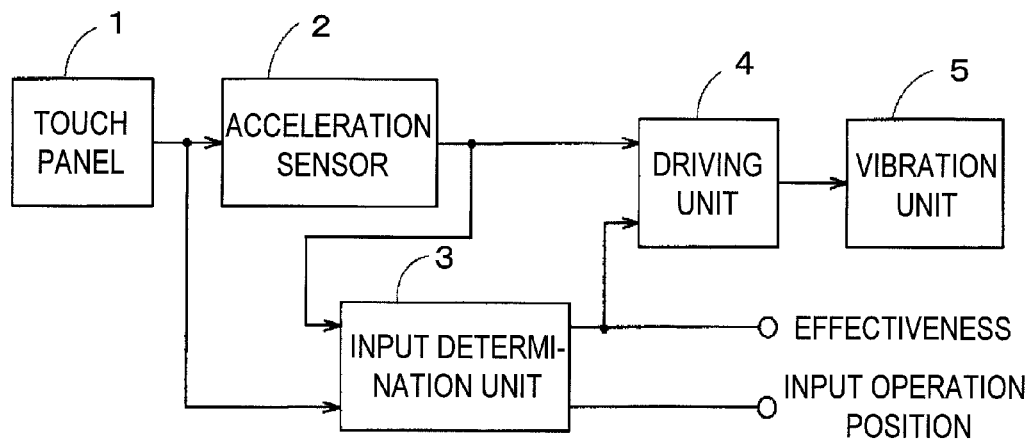
FIG. 2 is a schematic block diagram illustrating an internal configuration of the input device 100.

FIG. 1 is a perspective view illustrating an input device 100 according to a first illustrative embodiment, and FIG. 2 is a schematic block diagram illustrating an internal configuration of the input device 100. The input device 100 has a touch panel (input operation unit) 1, an acceleration sensor (input operation detection unit) 2, an input determination unit 3, a driving unit 4 and a vibration unit 5. Since the acceleration sensor 2, the input determination unit 3 and the driving unit 4 are installed in the input device 100, they are not shown in FIG. 1.

An input operation is input on the touch panel 1 by the user. Compared to a typical keyboard, the input device 100 does not have touch keys on a surface thereof, and a desired input is performed by an input operation to a predetermined position 1a on a surface of the touch panel 1. Since the input device 100 does not have touch keys, bumps are not formed on the surface. Hence, foreign dusts are not deposited the surface or inside thereof well, so that the input device can be kept clean.

The input operation on the touch panel 1 means that, for example, a finger tip or touch pen is touched or pressed on the predetermined position 1a on the surface of the touch panel 1. An electrostatic capacitance type touch panel or an resistance film type touch panel can be used as the touch panel 1, for example. In addition, a variety type of the touch panels 1 may be used.

The acceleration sensor 2 quickly detects when acceleration is caused to the touch panel 1. The time required to detect the acceleration by the acceleration sensor 2 is extremely short, compared to the time required to obtain a determination result by the input determination unit 3.

The acceleration is caused to the touch panel 1 and then detected at time when a user performs an input operation on the touch panel 1, when the user presses a position other than the predetermined position 1a, or when external vibration is applied. Also, when a pulse-type noise is generated in performing a determination by the input determination unit 3, the acceleration may be erroneously detected in some cases.

That is, even when the acceleration sensor 2 detects the acceleration, it may not mean that the input operation is performed without fail. To the contrary, when an input operation is a soft touch and the acceleration caused to the touch panel 1 is extremely small, the acceleration sensor 2 may not detect the acceleration in some cases even when a user performs an input operation.

When the acceleration is detected by the acceleration sensor 2, the input determination unit 3 determines whether the detection result is an effective input operation. Also, the input determination unit 3 detects whether an effective input operation is performed on the touch panel 1 with respect to each of the predetermined positions 1a, regardless of the detection of the acceleration sensor 2. Here, the effective input operation is an input operation recognized rightly by the input device 100. For example, the effective input operation includes a pressing operation for a predetermined time period or longer on the predetermined position 1a of the touch panel 1. Also, the ineffective input operation is a wrong input operation and includes a pressing operation on a position except for the predetermined positions 1a and a pressing operation for extremely short time. In addition, an output of the acceleration sensor 2 caused due to external vibration, noise and the like is also included in the ineffective input operation.

More specifically, the input determination unit 3 sequentially scans whether an input operation is performed for each of the predetermined positions 1a of the touch panel 1, thereby determining whether or not an input operation. Also, in order to remove chattering, the input determination unit 3 performs the scanning several times. When the input operation is continuously performed on the same predetermined position 1a, the input determination unit 3 determines that the input operation is an effective input operation. Thereby, the input determination unit 3 can determine whether the input operation is an effective input operation, and when the input operation is the effective input operation, the input determination unit 3 can determine a corresponding position. A result of the determination is input into a personal computer (not shown) that is connected to the input device 100. By the above process, the time required to obtain the determination result is 20 ms, for example.

The driving unit 4 supplies a driving signal to the vibration unit 5 to vibrate the vibration unit 5, in response to the outputs of the acceleration sensor 2 and the input determination unit 3. More specifically, when acceleration having a predetermined threshold or greater is detected by the acceleration sensor 2, the driving unit 4 immediately vibrates the vibration unit 5. Also, when the input determination unit 3 determines that the detection result of the acceleration sensor 2 is the effective input operation, or when the effective input operation is detected by the input determination unit 3 even though the acceleration sensor 2 has not detected the acceleration, the driving unit 4 vibrates the vibration unit 5 for a predetermined time period and then stops the vibration. In addition, when it is determined that the detection result of the acceleration sensor 2 is not the effective input operation, the driving unit 4 immediately stops the vibration of the vibration unit 5.

The vibration unit 5 is provided on a backside of the touch panel 1, for example. A motor (not shown) is rotated by the driving signal supplied from the driving unit 4, so that the vibration unit 5 vibrates. The touch panel 1 is little deformed even when the input operation is performed. Accordingly, when an effective input operation is performed on the input device 100, the vibration unit 5 vibrates to notify the user that the input operation is successful. In the meantime, a housing of the input device 100 may be configured as the vibration unit 5 so that the entire input device 100 may be vibrated.

Figure 3:
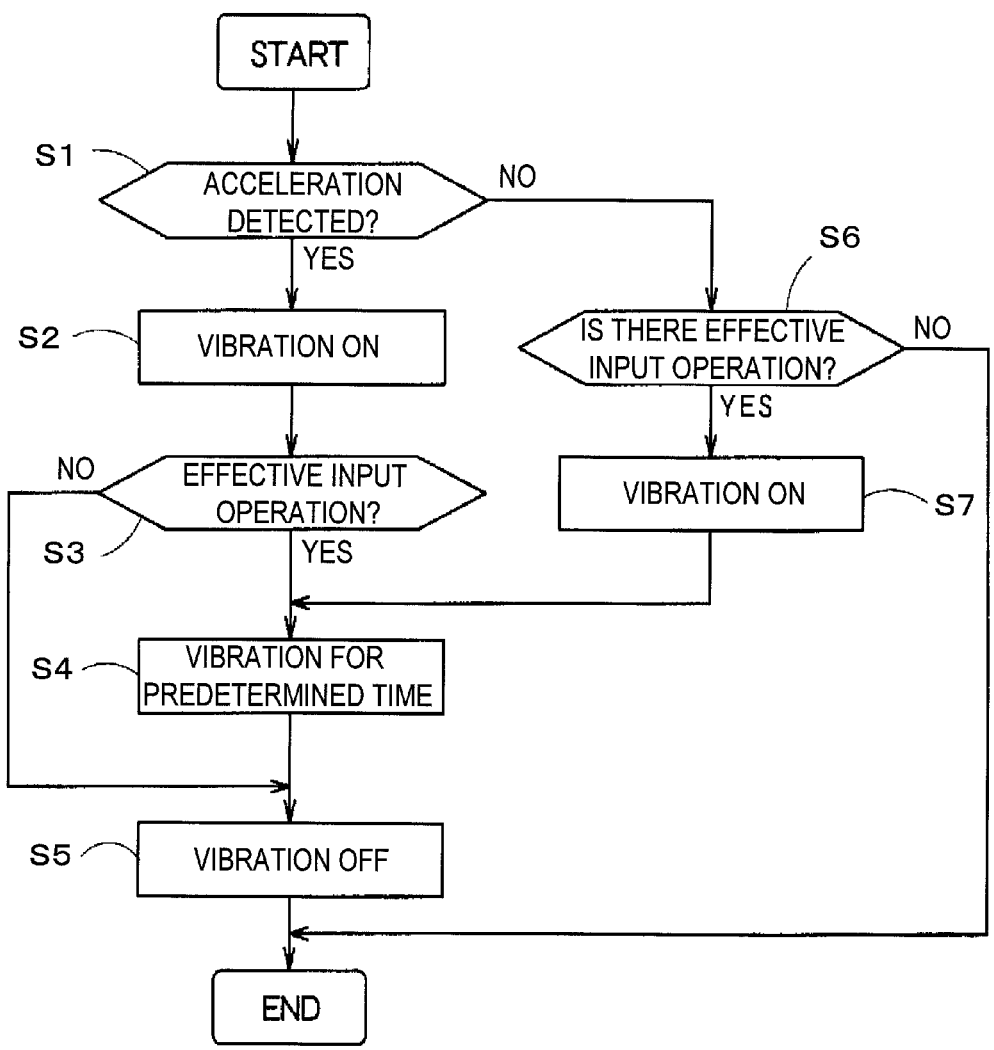
FIG. 3 is a flowchart illustrating an example of a processing operation of the input device 100 shown in FIGS. 1 and 2.

FIG. 3 is a flowchart illustrating an example of a processing operation of the input device 100 shown in FIGS. 1 and 2.

When the acceleration sensor 2 detects the acceleration to the touch panel 1 (YES in step S1), the driving unit 4 immediately vibrates the vibration unit 5 (step S2). Before the input determination unit 3 performs the determination, the vibration unit 5 starts to vibrate. Accordingly, a user can quickly know that an input operation is detected.

After that, the input determination unit 3 determines whether the detection result of the acceleration unit 2 is an effective input operation (step S3). When it is determined that the detection result is the effective input operation (YES in step S3), the driving unit 4 vibrates the vibration unit 5 for a predetermined time period (step S4) and then stops the vibration (step S5). On the other hand, when it is determined that the detection result is not an effective input operation (NO in step S3), the driving unit 4 immediately stops the vibration of the vibration unit 5 (step S5).

When it is determined that the detection result is an effective input operation, the vibration time is to be long, and when it is determined that the detection result is not an effective input operation, the vibration time is to be short. Therefore, the user can know whether the input operation is an effective input operation. Further, even when the acceleration sensor 2 outputs an erroneous output signal due to the external vibration or noise, rather than the input operation, the input determination unit 3 determines that it is not effective, so that the vibration unit 5 can stop the vibration.

On the other hand, even when the acceleration sensor 2 has not detected acceleration to the touch panel 2 (NO in step S1), the input determination unit 3 determines whether an effective input operation is performed for each of the predetermined positions 1a (step S6). When it is determined that an effective input operation is performed (YES in step S6), the driving unit 4 vibrates the vibration unit 5 (step S7). Thereby, even when the acceleration sensor 2 cannot detect an input operation, such as a case where the input operation is a soft touch, the vibration unit 5 vibrates when an effective input operation is detected by the input determination unit 3. Accordingly, the user can know that the input operation is successful.

In the below, the processing operation of the input device is described with reference to a specific example.

Figure 4:
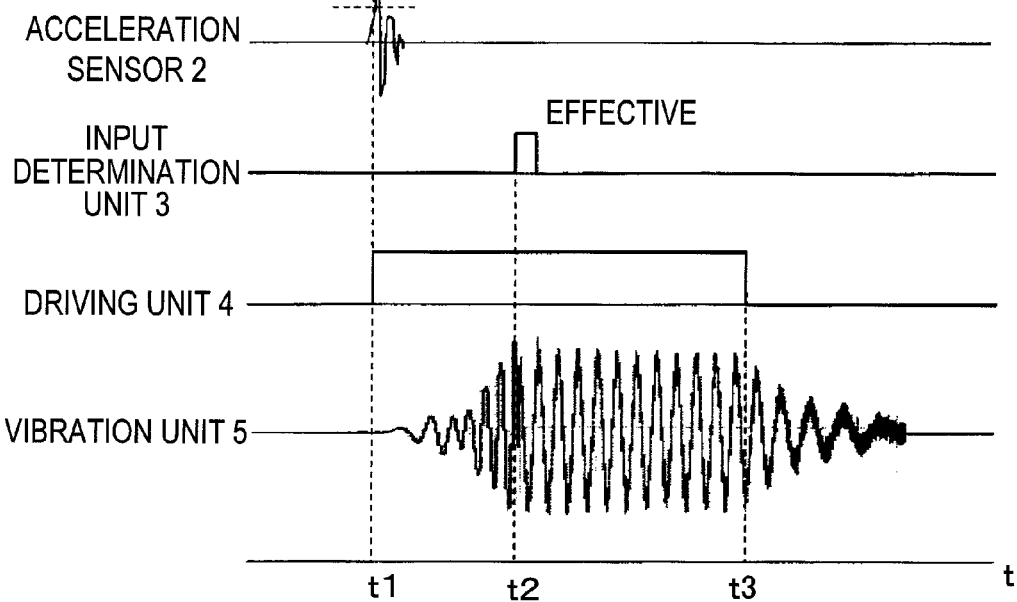
FIG. 4 illustrates an example of output signal waveforms of respective units when an acceleration sensor 2 detects an effective input operation.

FIG. 4 shows an example of output signal waveforms of respective units when the acceleration sensor 2 detects an effective input operation. That is, FIG. 4 shows an example when a user rightly presses the predetermined position 1a on the surface of the touch panel 1. The output signal of the acceleration sensor 2 is a voltage proportional to the acceleration. The output signal of the input determination unit 3 indicates a result of the determination, i.e., whether an input operation is effective. The output signal of the driving unit 4 is a driving signal for driving the vibration unit 5, and the driving unit 4 vibrates the vibration unit 5 during a period corresponding to a power supply voltage being high. The output signal of the vibration unit 5 indicates the vibration of the vibration unit 5.

When a user performs an input operation and the acceleration is detected by the acceleration sensor 2 exceeds a predetermined threshold at time t1 (YES in step S1 of FIG. 3), the driving unit 4 immediately supplies a driving signal to the vibration unit 5 (step S2). Thereby, the vibration unit 5 starts to vibrate and the user can know that the input operation has been detected. Subsequently, the input determination unit 3 determines whether the detected acceleration is an effective input operation. In a case of this example, it is determined at time t2 that the detected acceleration is an effective input operation (YES in step S3). Then, the driving unit 4 vibrates the vibration unit 5 for a predetermined time period (step S4) and stops the vibration at time t3 (step S5). The time t2 to t3 is 100 ms, for example. Like this, since the vibration continues relatively long up to time t1 to t3, the user can know that the input operation is effective.

Figure 5:
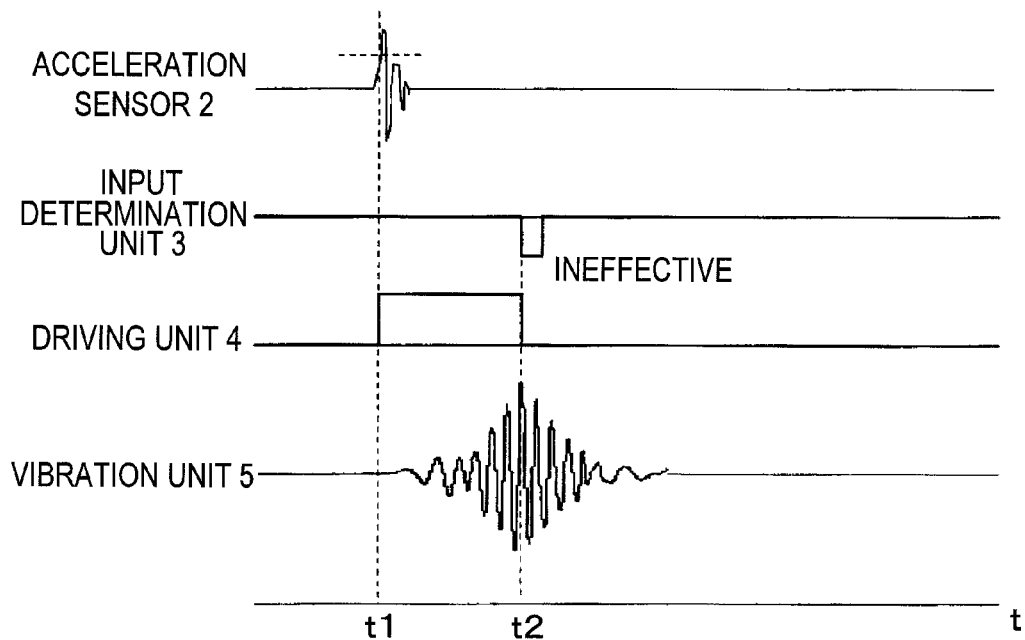
FIG. 5 illustrates an example of output signal waveforms of respective units when the acceleration sensor 2 detects an ineffective input operation.

FIG. 5 shows an example of output signal waveforms of respective units when the acceleration sensor 2 detects an ineffective input operation. For example, FIG. 5 shows a case where a user erroneously presses the predetermined position 1a on the surface of the touch panel 1.

When a user performs an input operation and thus the acceleration detected by the acceleration sensor 2 exceeds a predetermined threshold at time t1 (YES in step S1 of FIG. 3), the driving unit 4 immediately supplies a driving signal to the vibration unit 5 (step S2). Thereby, the vibration unit 5 starts to vibrate and thus the user can know that the input operation has been detected. Subsequently, the input determination unit 3 determines whether the detected acceleration is an effective input operation. In a case of this example, it is determined at time t2 that the detected acceleration is the ineffective input operation (NO in step S3). Then, the driving unit 4 immediately stops the vibration of the vibration unit 5. That is, the vibration starts at time t1 and stops just after time t2. Like this, since the vibration time is relatively short, compared to FIG. 4, the user can know that the input operation is not effective.

As described above, even when a user does not perform an input operation, the acceleration sensor 2 may detect the acceleration due to the external vibration, the noise and the like, so that the vibration starts. Also in this case, the processing operation of FIG. 5 is executed. However, since the vibration time is short, the user can know that any input operation has not been performed on the input device 100.

Figure 6:
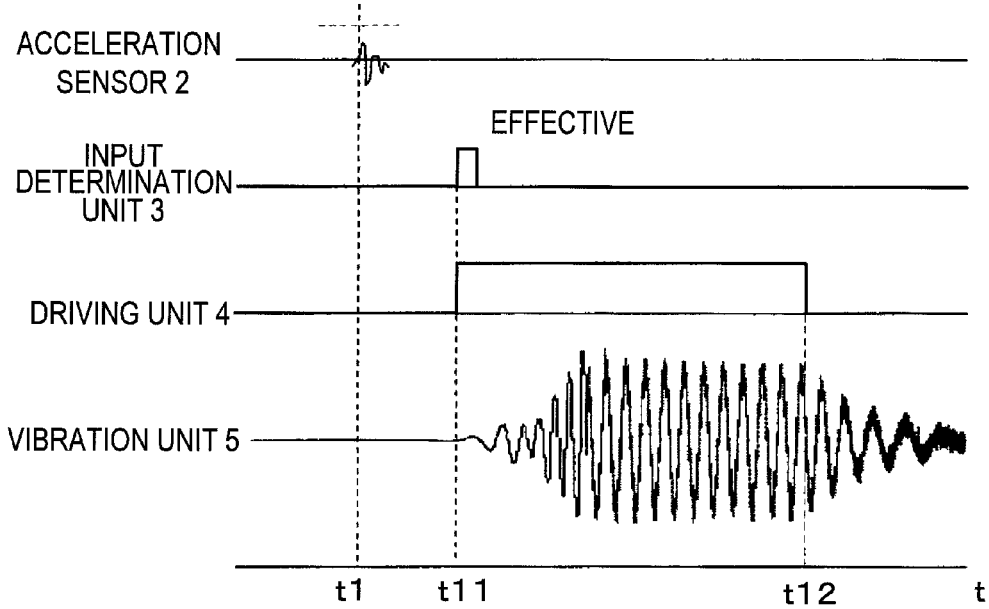
FIG. 6 illustrates an example of output signal waveforms of respective units when an input operation is not detected by the acceleration sensor 2 but an influential input operation is detected by an input determination unit 3.

FIG. 6 illustrates an example of output signal waveforms of respective units when an input operation is not detected by the acceleration sensor 2, and but an effective input operation is detected by the input determination unit 3. For example, FIG. 6 illustrates a case where the predetermined position 1a is pressed by a soft touch.

In this case, since acceleration caused to the touch panel 1 at time t1 is small and does not exceed a predetermined threshold, the acceleration sensor 2 does not detect the acceleration (NO in step S1). However, since the input operation is being performed on the touch panel 1, the effective input operation is detected by the input determination unit 3 at time t11 (YES in step S6). Then, the driving unit 4 supplies a driving signal to the vibration unit 5 (step S7) and the vibration unit 5 starts to vibrate. The driving unit 4 vibrates the vibration unit 5 for a predetermined time period (step S4) and stops the vibration at time t12 (step S5). The time t11 to t12 is set to be longer than at least the time t1 to t2 of FIG. 4. Thereby, since the vibration continues relatively long, the user can know that the input operation is effective.

Like this, in the first illustrative embodiment, the input device 100 is provided with the acceleration sensor 2 and the vibration unit 5 immediately vibrates when the acceleration is caused to the touch panel 1. Since the vibration is initiated without waiting for the determination result by the input determination unit 3, the user can quickly know that the input operation is detected. Also, when the input operation is effective, the vibration is continued for a predetermined time period, and when the input operation is not effective, the vibration is immediately stopped. Accordingly, the user can know whether the input operation is effective by the vibration time.

Second Illustrative Embodiment

In the first illustrative embodiment, the acceleration sensor 2, the driving unit 4 and the vibration unit 5 are installed in the input device 100. However, in a second illustrative embodiment, the above constitutional members are provided in a vibration device separated from the input device.

Figure 7:
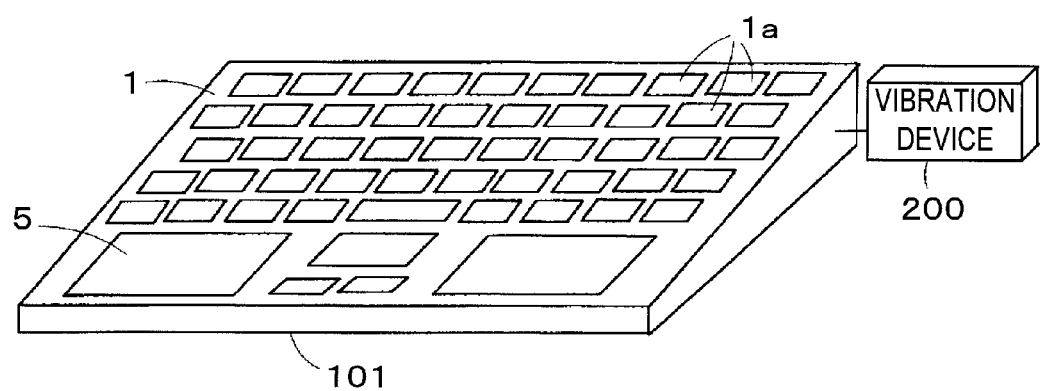
FIG. 7 is a perspective view illustrating an input system according to a second illustrative embodiment.
Figure 8:
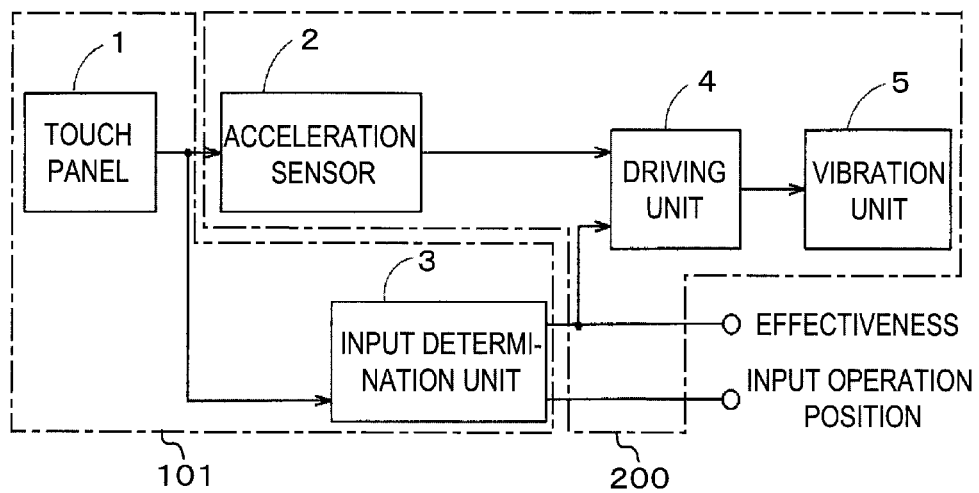
FIG. 8 is a schematic block diagram illustrating internal configurations of an input device 101 and a vibration device 200.

FIG. 7 is a perspective view illustrating an input system according to a second illustrative embodiment, and FIG. 8 is a schematic block diagram illustrating internal configurations of an input device 101 and a vibration device 200. In FIGS. 7 and 8, the common constitutional members to FIGS. 1 and 2 are indicated with the same reference numerals, and difference points will be described in the below.

As shown in FIGS. 7 and 8, the input device 101 has the touch panel 1 and the input determination unit 3. Also, the vibration device 200 has the acceleration sensor 2, the driving unit 4 and the vibration unit 5. The vibration device 200 is attached to the input device 101. The acceleration sensor 2 is provided to detect the acceleration of the touch panel 1. Also, an output signal of the input determination unit 3 in the input device 101 is input to the vibration device 200, and a signal indicating whether there is an effective input operation is input to the driving unit 4. In addition, the determination result of the input determination unit 3 is input to a personal computer (not shown) via the vibration device 200. The differences points between the first and second illustrative embodiments are that the output signal of the acceleration sensor 2 is not input to the input determination unit 3 in the input device 101.

Figure 9:
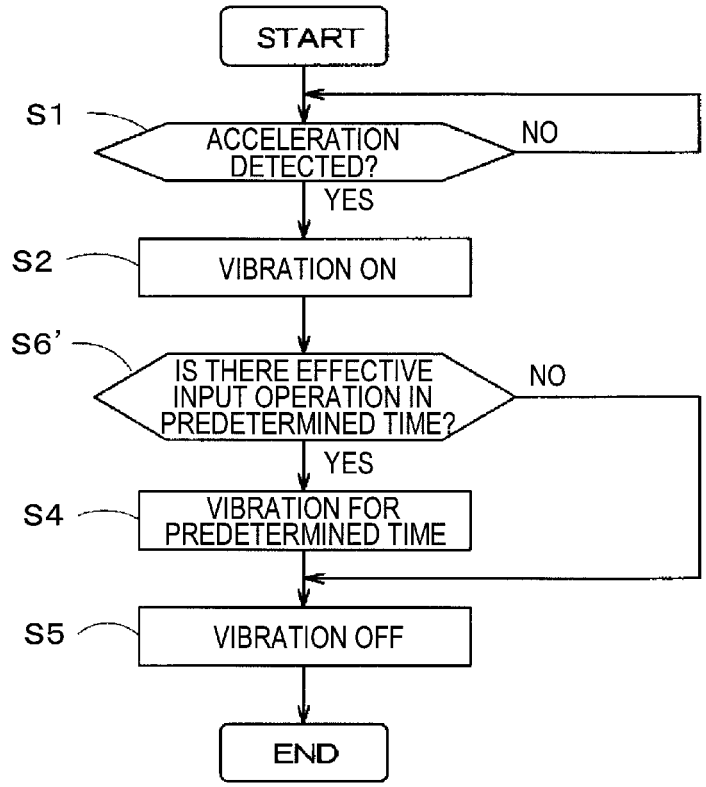
FIG. 9 is a flowchart illustrating an example of a processing operation of the input device 101 shown in FIGS. 7 and 8.

FIG. 9 is a flowchart illustrating an example of a processing operation of the input device 101 shown in FIGS. 7 and 8. When the acceleration sensor 2 detects the acceleration to the touch panel 1 (YES in step S1), the driving unit 4 immediately vibrates the vibration unit 5 (step S2). Differently from the first illustrative embodiment, the detection result of the acceleration sensor 2 is not input to the input determination unit 3. Accordingly, when the input determination unit 3 detects an effective input operation in a predetermined time period (YES in step S6'), the driving unit 4 vibrates the vibration unit 5 for a predetermined time period (step S4) and then stops the vibration (step S5). On the other hand, when the input determination unit 3 does not detect an effective input operation in a predetermined time period (NO in step S6'), it is determined that the acceleration detected by the acceleration sensor 2 is an ineffective input operation, and the driving unit 4 immediately stops the vibration of the vibration unit 5 (step S5).

In the meantime, the input device 101 may be a typical keyboard having touch keys, instead of the touch panel 1, as the input operation unit.

Like this, in the second illustrative embodiment, the vibration device 200 is provided separately from the input device 101. Also in this case, since the vibration is started without waiting for the determination result of the input determination unit 3, the user can quickly know that the input operation is detected. Also, the vibration device 200 has only to be attached to the typical keyboard, so that the input system shown in FIGS. 7 and 8 can be simply constructed.

In the meantime, a pressure sensor may be used as the input operation detection unit, instead of the acceleration sensor 2. When the pressure sensor is used, an input operation is detected by pressure applied to the touch panel 1. In this case, since some users always put a finger lightly on the input device 100, it is necessary to subtract the pressure of the steady state for detecting the applied pressure.

Based on the above descriptions, it may be possible to assume a variety of additional effects of the present invention and modifications. However, the present invention is not limited to the above illustrative embodiments. That is, it is possible to add, change and delete the constitutional members without departing from the scope of the present invention assumed from the claims and the equivalents thereof.

What is claimed is:

1. An input device comprising:
   an input operation unit, on which an input operation is performed;
   an input operation detection unit that detects at least one of acceleration and pressure to the input operation unit;
   an input determination unit that determines whether the at least one of acceleration and pressure detected by the input operation detection unit is an effective input operation; and
   a vibration unit that, when the at least one of acceleration and pressure is detected by the input operation detection unit, immediately starts to vibrate without any additional processing.

2. The input device according to claim 1,
   wherein a time period during which the vibration unit vibrates is different depending on a determination result of the input determination unit.

3. The input device according to claim 2,
   wherein the vibration unit stops vibration when the input determination unit determines that the at least one of acceleration and pressure is not the effective input operation.

4. The input device according to claim 2,
   wherein, when the input determination unit determines that at least one of acceleration and pressure is the effective input operation, the vibration unit continues to vibrate for a predetermined time period and then stops vibration.

5. The input device according to claim 1,
   wherein the input operation unit is a touch panel, on which the input operation is performed by touching a predetermined position on a surface thereof.

6. The input device according to claim 1,
   wherein the vibration unit starts to vibrate regardless of a determination by the input determination unit.

7. An input device comprising:
   an input operation unit, on which an input operation is performed;
   an input operation detection unit that detects at least one of acceleration and pressure to the input operation unit;
   an input determination unit that determines whether the at least one of acceleration and pressure detected by the input operation detection unit is an effective input operation; and
   a vibration unit that generates vibration,
   wherein when the at least one of acceleration and pressure is detected by the input determination unit, the vibration unit immediately starts to vibrate without any additional processing, and
   wherein, even when the at least one of acceleration and pressure is not detected by the input operation detection unit, when the input determination unit determines that there is the effective input operation, the vibration unit generates the vibration for a predetermined time period thereafter.

8. The input device according to claim 7,
   wherein the vibration unit starts to vibrate regardless of a determination by the input determination unit.

9. A vibration device that is to be attached to an input device comprising an input operation unit on which an input operation is performed and an input determination unit that detects whether an effective input operation is performed on the input operation unit, the vibration device comprising:
   an input operation detection unit that detects at least one of acceleration and pressure to the input operation unit; and
   a vibration unit, which immediately starts to vibrate without any additional processing when the at least one of acceleration and pressure is detected by the input operation detection unit, and which stops vibration when the effective input operation to the input operation unit is not detected in a predetermined time period after the at least one of acceleration and pressure is detected.

10. The input device according to claim 9,
    wherein the vibration unit starts to vibrate regardless of a determination by the input determination unit.

11. An input detection method of using an input device having a vibration unit, the method comprising:
    detecting at least one of acceleration and pressure to an input operation unit;
    immediately starting vibration of the vibration unit without any additional processing when the at least one of acceleration and pressure is detected;
    determining whether the detected at least one of acceleration and pressure is an effective input operation; and
    stopping the vibration of the vibration unit or continuing the vibration for a predetermined time period, depending on a result of determining whether the detected at least one of acceleration and pressure is the effective input operation.

12. The input device according to claim 11,
    wherein the starting vibration of the vibration unit occurs regardless of the determination whether the detected at least one of acceleration and pressure is the effective input operation.

* * * * *